3,105,763
CONCENTRATED MILK
Gerald C. North, Peter P. Noznick, and Robert H. Bundus, Chicago, Ill., assignors to Beatrice Foods Co., Chicago, Ill., a corporation of Delaware
No Drawing. Filed Mar. 22, 1960, Ser. No. 16,647
5 Claims. (Cl. 99—55)

This invention relates to a concentrated sterilized milk product which can be packaged in a metal can or other suitable or conventional container and remain sterile for an extended time period, e.g. six months to a year or more on the grocer's shelf without the necessity of refrigeration. By "milk product" we mean normal milk, cream, skimmilk and mixtures of the same. By "concentrated," we mean a milk product in which the solids content is increased from about 12% as in the case of normal whole milk to about 34% or more, in which latter concentration of about 2 to 1, the milk may be reconstituted with about two volumes of water to form a product similar to normal whole milk.

The principal object of this invention is to provide a product of the character described which will be substantionally devoid of chalkiness, stable against age gelation and closely similar in flavor and color to normal milk when reconstituted with at least 2 volumes of water.

An equally important object of this invention is to provide a process of preparing the stable, concentrated, sterile milk which will be simple and economical and rapid to the end that uniformly acceptable sterile products will be made at a feasible commercial rate.

We preferably deaerate the milk at about 130° F. to 135° F., notably 132° F., preliminary to carrying out the following examples to assist in reduction of cooked flavor by flashing the milk into a vacuum chamber having a pressure of about 25 in. to 29 in., notably 27 in. of mercury and the milk so deaerated has its temperature reduced to about 110° F.

Forewarming is used in the subsequent examples to maintain sterilization heat stability to gelation, i.e. to keep the milk from gelling subsequently during sterilization. Any forewarming is used which will stabilize the product against heat coagulation under sterilization. We prefer high temperature, short-time, forewarming because it was successful in precluding heat coagulation of protein.

Where the milk has about 34% solids, forewarming at about 255° F. for about 400 seconds is useful. At about 26% solids, forewarming at about 265° F. for about 110 seconds is useful. At about 30% solids, forewarming at about 260° F. for about 180 seconds is useful. We prefer to use low temperature, long-time forewarming for low concentration milk, and high temperature, short-time, forewarming for high concentration. In this manner, gelling, off color, off-taste, and sedimentation are successfully avoided in carrying out this invention, as illustrated in the following examples.

Forewarming was conducted as described in the above examples and in carrying out the invention in a tubular heat exchanger or plate heat exchanger, or a swept wall heat exchanger is useful, and the forewarming temperature and time range was from about 205° F. to 265° F. for about 110 seconds to about 500 seconds.

Example 1

Normal milk in amount of 50 gallons (containing about 88% water and about 12% solids) after deaeration as previously describes was forewarmed in a tubular heat exchanger to about 255° F. in a heat-up time of about 5 seconds, for about 110 seconds. This is not a severe treatment and helps in preparing a desirable product. The forewarmed milk was flash cooled in a vacuum chamber to about 145° F. and at the same time subjected to vacuum in the same vacuum pan under a reduced pressure of about 26 inches of mercury until it contained about 26% total solids and a temperature of about 125° F. It was thus so concentrated as to require addition of about 1.2 volumes of water to reconstitute to the original milk. The concentrated milk was now heated up to 255° F. in about 5 seconds and sterilized at about 255° F. for about 400 seconds in a tubular heat exchanger, then flash cooled under vacuum in a sterile evaporator (vacuum pan) to about 130° F. and at the same time aseptically concentrated in the sterile vacuum pan to about 34% solids, i.e. a concentration requiring 2 volumes of water to 1 volume of concentrate (2 to 1) to (a) result in about a 12% total solids milk, and (b) removal of both off flavors and cooked flavors. The sterile concentrate was now homogenized at about 130° F. under about 8000 p.s.i.g. in a sterile homogenizer. The concentrate at about 135° F. was scrubbed by bubbling into it oxygen to chemically remove cooked flavors. This treatment with oxygen was conducted in a sterile tube section of a tubular heat exchanger and thereafter, the concentrate was treated in a sterile vacuum chamber under about 25 inches of mercury to remove any excess of oxygen remaining in the concentrate after the introduction of the gas was stopped. The concentrate was now cooled in a sterile tubular heat exchanger cooler to about 100° F. and aseptically canned as in an apparatus such as shown and described in the patent to Martin, 2,549,216. Homogenization after sterilization is preferred in most cases because when done before sterilization this may detract from the flavor and interfere with stability during the subsequent sterilization, i.e. coagulation of the protein is produced which is eliminated or satisfactorily reduced when we homogenize after sterilization as in the foregoing example.

Example 2

This example was like Example 1 except that the initial concentration of the milk to be treated was to about 34% solids (2:1). This initial concentration was accomplished as described above in Example 1, i.e. deaerating, forewarming, flash cooling and concentrating to about 34% solids. This was followed by sterilization at 265° F. for 110 seconds in a sterile tubular heat exchanger (heat-up time about 5 seconds), and cooling to about 110° F. in a sterile tubular heat exchanger. The concentrate was then treated at about 110° F. with nitrogen in a vacuum chamber under 25 inches of mercury. The nitrogen was bubbled into and through the concentrate, thereby scrubbing and removing cooked flavors. Oxygen was thereafter bubbled into the concentrate, as described, while at about 110° F. in a sterile tube, and the concentrate was then treated in a vacuum chamber under 25 inches of mercury to remove residual oxygen. The sterile concentrate was then homogenized at about 110° F. in a sterile homogenizer at 9000 p.s.i.g. and cooled to about 60° F. in a sterile tube and aseptically canned as described. The homogenization was also subsequent to sterilizing in this example.

Example 3

In this example sterile air was substituted for oxygen in Example 1.

Example 4

In this example sterile air was substituted for the oxygen in Example 2.

Examples 5 and 5a

Instead of bubbling nitrogen through the sterile concentrate in Example 2, in the carrying out of this invention, steam was introduced to remove off flavors as by steam distillation followed by treatment with oxygen in Example 5 and sterile air in Example 5a.

Examples 6, 6a, 6b, 6c 6d

In other examples, the procedure was the same as that described in the preceding examples except the sterile homogenization preceded the nitrogen and steam distillation, and the oxygen and sterile air treatments, or combinations of these gas treatment. The vacuum treatment to remove excess oxygen or air introduced to the product and following such inert gas treatments was the same as described.

Examples 7, 7a

Instead of scrubbing with an inert gas such as nitrogen, as in preceding examples, we introduced steam, as stated, in a sterile vacuum pan at 26 inches to 27 inches of mercury to remove off flavors and in some instances we used, in Example 7a, both the inert gas and steam for this purpose, the nitrogen preferably preceding the steam but the mixture of the two gave a good result with subsequent oxygen or sterile air treatment as described above.

As will be observed, when initially concentrated to 2:1, following sterilization it is unnecessary to concentrate further, as exemplified by Example 2.

Flash cooling in the preceding examples was also carried out to between about 110° F. and 185° F. and homogenization was conducted with the concentrate at about 110° F. to 185° F. Final cooling in the tube cooler was conducted at a temperature between about 60° F. and 100° F. before aseptically canning.

Generally, initial concentration as in the foregoing examples is conducted with the milk at about 110° F. to 145° F. followed by sterilizing preferably at about 265° F. for 110 seconds to 255° F. for 400 seconds. In the succeeding sterile vacuum pan concentration and flash cooling, the milk preferably has a reduced temperature of about 110° F. to 145° F. and where further concentration is not necessary as in Example 2, the sterile tube cooler (heat exchanger) reduces the milk to the same temperature. The sterile milk is treated with nitrogen or steam distillation, followed by treatment with oxygen or sterile air while at a temperature of about 110° F. to 185° F., treated in a vacuum pan to remove excess oxygen or air and homogenized in a sterile homogenizer at within about this temperature range. Cooling of the sterile concentrate was preferably in a sterile tube cooler, heat exchanger, but a sterile vacuum pan at a pressure of 25 inches to 27 inches of mercury is useful for canning.

This concentrated product required no refrigeration and after about 6 months to one year was free of chalkiness and gelation and sedimentation and had been kept on the shelf without refrigeration. When reconstituted with about two equal volumes of tap water, they closely simulated the milk from which the concentrate was made in all respects, including taste, color and flavor.

We observed a critical range of concentration exists before sterilization, in carrying out various examples similar to the above, i.e. when a minimum initial concentration of about 21% solids was obtained, about .8 volume of water was required to reconstitute the concentrate satisfactorily to the original milk; at about 23½% solids, about 1.00 volume was required; at about 26½% solids, about 1.2 volumes was satisfactory; at about 28% solids, about 1.4 volumes were successful; at about 30%, about 1.6 volumes were useful; at about 32%, about 1.8 volumes were required; and at about 34%, about 2.0 volumes were (as stated) needed to make an acceptable water reconstituted product from the sterile concentrates. The percentages and volumes just mentioned, are based on painstaking efforts to be as accurate as possible must necessarily be regarded as somewhat approximate.

The sterilizing was carried out in various examples at about 265° F. for about 110 seconds, the object, of course, being to produce a sterile product without cooked flavor. Cooling thereafter was conducted to about 185° F. in one example and 130° F. in another, and within this range of 130° F. to 185° F., the widest cooling range being about 110° F. to 185° F.; as previously indicated.

Sterile homogenization was carried out in the practice of this invention at about 7,000 to 10,000 p.s.i.g., the higher pressure being preferred.

As described above, the temperature of the concentrate during scrubbing with the inert gas, e.g. nitrogen or steam, was from about 110° F. to 185° F. This treatment was followed by treating with oxygen or sterile air, as described. The pressure in the vacuum pan for removing excess oxygen or air was between about 25 inches to 27 inches of mercury. The heated concentrate was cooled to about 100° F. to 60° F., whereupon it was aseptically canned as described.

We find the sterilization temperatures and hold times (255° F. for 400 seconds to 265° F. for 110 seconds) are critical not only to achieve sterility and minimum changes in color and flavor but the longer (110 seconds to 400 seconds) hold times used to achieve sterilization are necessarily used to minimize chalkiness and sedimentation. Shorter hold times (less than 110 seconds) although achieving sterilization may result in chalkiness and sedimentation. The shorter the hold times, the larger the sedimentation rates.

For instance, 300 seconds at 255° F. would have a greater tendency to gel on storage than 400 seconds at 255° F. 265° F. at 60 seconds, because of the short-hold time, would have greater chalkiness, sedimentation and tendency to storage gelation than if a hold time of 110 seconds were used. The longer hold time will preclude substantial sedimentation and chalkiness. As the concentration at sterilization increases, the hold time of sterilization is decreased to maintain he same color and flavor.

Thus, in the examples given, in Example 1, for instance, where the sterilization temperature is constant and the hold time is constant, the resistance to gelation on storage is effected logarithmically by the concentration at sterilization, i.e. when the concentration is .8% and the temperature 255° F.

Stated another way, we find that to increase resistance to gelation, as we reduce hold time, we have to increase concentration at the sterilization temperature.

At 34% solids, for instance, with a temperature above 265° F., we would have to decrease the hold time to preclude resultant chalkiness and sedimentation. Therefore, 110 seconds at 265° F. is the best range.

Any temperature which is suited to the preferred hold times specified, namely 110 seconds to 400 seconds, with the preferred temperature range of about 255° F. to 265° F. at the concentrations referred to above, is successfully used. However, 60 seconds at 270° F. is unsatisfactory, because sedimentation and chalkiness result, due to the short hold time.

As pointed out, the higher the concentration, the shorter the hold time is a preferable procedure in accordance with our invention. This is indicated by the fact that at 34% solids concentration, a preferable temperature is 265° F., and a hold time of 110 seconds, and at 26% solids, a temperature of 255° F. and a hold time of 400 seconds is preferable.

The sterilization time and temperature while critical to assure the improved characteristics above recited are interrelated with the concentration and a sterilization, as pointed out. That is, hold time temperature and concentration at sterilization are all interrelated.

We have also found that for any given time and temperature, the effect of concentration, as stated, is related logarithmically to the gelation time beginning at the critical concentration mentioned, namely 0.8 to 1. The same sterilization time and temperature applied to products at lower concentration does not affect stability to gelation. Hence, as we increase temperature, we decrease hold time. For any given temperature and time of sterilization the stability to gelation is affected logarithmically by the concentration at sterilization. This is difficult to graphically set forth, but briefly, it can be stated that the higher the concentrations at sterilization the more pronounced is the change in color and flavor for a given time and temperature. Hence, we have observed that the shorter hold times to achieve sterilization, as stated in the examples, are preferred for high concentration at sterilization, i.e. concentration ratio 2:1, because of the reduced effect upon color and flavor. We have found, as stated, that below 34% solids with a temperature above 265° F., the hold time would have to be decreased to avoid chalkiness and sedimentation. Therefore, below 34% solids for best results we decrease the temperature and increase the hold time as in Example 1.

This application is a continuation-in-part of application Serial No. 829,557, filed July 27, 1959, and now abandoned.

We claim:

1. The process of making a concentrated stable sterile milk product substantially free of chalkiness, resistant to gelation for a commercially feasible shelf life without refrigeration, and reconstitutable with water to produce a milk having the nutritional value and closely simulating the appearance and flavor of the original milk, comprising in the sequence recited deaerating and forewarming the milk product at a temperature from 205° F. to 265° F. for about 110 seconds to about 500 seconds, concentrating the same to a solids content between about 21% to 34%, and reconstitutable with from about .8 volume to 2 volumes of added water to the original concentration, sterilizing at about a range of 255° F. for 400 seconds to 205° F. for 110 seconds, flash cooling to a temperature between about 110 and 185° F., homogenizing, removing off flavors and cooked flavors by bubbling oxygen containing gas into the milk followed by treatment under reduced pressure to remove any excess gas remaining in the milk, under sterile conditions, and packaging under aseptic conditions to provide a sterile package of the concentrate.

2. The process according to claim 1 wherein an inert gas is introduced to the milk prior to the introduction of the oxygen containing gas.

3. The process according to claim 2 wherein the inert gas is selected from the group consisting of steam and nitrogen.

4. The process according to claim 1 wherein the homogenizing is conducted after the introduction of the oxygen containing gas.

5. The process according to claim 1 wherein the oxygen containing gas is sterile air.

References Cited in the file of this patent

UNITED STATES PATENTS

| | | |
|---|---|---|
| 2,091,606 | Murray | Aug. 31, 1937 |
| 2,207,817 | Parker et al. | July 16, 1940 |
| 2,481,414 | Grindrod | Sept. 6, 1949 |
| 2,788,283 | Stewart et al. | Apr. 19, 1957 |
| 2,822,277 | Ellertson | Feb. 4, 1958 |
| 2,886,450 | Stewart et al. | May 12, 1959 |

OTHER REFERENCES

"Condensed Milk and Milk Powder," by Hunziker, O. F., 1949, 7th ed., published by the author, La Grange, Ill., pp. 226, 227.